United States Patent [19]

Wilson et al.

[11] 4,288,732
[45] Sep. 8, 1981

[54] FORCED COMMUTATED STARTING CIRCUIT FOR LOAD COMMUTATED INVERTER DRIVE SYSTEM

[75] Inventors: James W. A. Wilson; Robert L. Steigerwald, both of Scotia, N.Y.

[73] Assignee: General Electric Company, Schenectady, N.Y.

[21] Appl. No.: 965,165

[22] Filed: Nov. 30, 1978

[51] Int. Cl.³ .......................... H02P 1/46; H02P 7/42
[52] U.S. Cl. .................................. 318/723; 318/801; 318/807; 363/137
[58] Field of Search ............... 318/720, 721, 722, 723, 318/807, 809, 810, 811, 812, 798–803; 363/135, 136, 137

[56] References Cited

U.S. PATENT DOCUMENTS

| 3,487,289 | 12/1969 | McMurray | 363/136 X |
| 3,763,417 | 10/1973 | Johnston | 318/810 |
| 3,838,330 | 9/1974 | Rosa | 363/137 X |
| 3,935,528 | 1/1976 | Brenneisen et al. | 363/136 X |
| 4,100,469 | 7/1978 | Nelson et al. | 318/721 X |
| 4,136,382 | 1/1979 | Ricci | 363/137 |
| 4,180,853 | 12/1979 | Scorso, Jr. et al. | 363/135 X |

FOREIGN PATENT DOCUMENTS

| 47-25921 | 7/1972 | Japan | 318/722 |
| 259256 | 4/1970 | U.S.S.R. | 363/137 |
| 515244 | 6/1976 | U.S.S.R. | 363/136 |
| 526993 | 12/1976 | U.S.S.R. | 363/137 |
| 541252 | 2/1977 | U.S.S.R. | 363/137 |
| 576645 | 9/1977 | U.S.S.R. | 363/135 |

OTHER PUBLICATIONS by H. J. Gutt: "The Design of A.C.-Controller-Fed Induction Machines . . . " Siemens Rev. XXXVIII (1971) No. 1, pp. 40–43.

Primary Examiner—S. J. Witkowski
Assistant Examiner—Richard M. Moose
Attorney, Agent, or Firm—William H. Steinberg; Paul R. Webb, II; James C. Davis, Jr.

[57] ABSTRACT

In an inverter-synchronous machine drive system wherein a synchronous machine is excited by an inverter from a source of direct current, a pair of controlled bidirectional conduction means are serially coupled across the source of direct current potential, and are coupled at their junction through a commutating capacitor to the machine neutral terminal. Each controlled bidirectional conduction means, together with corresponding phase connected thyristor within the inverter, is correspondingly gated in a predetermined sequence so as to cause alternating voltage to be applied across each corresponding machine phase for initial machine excitation.

5 Claims, 3 Drawing Figures

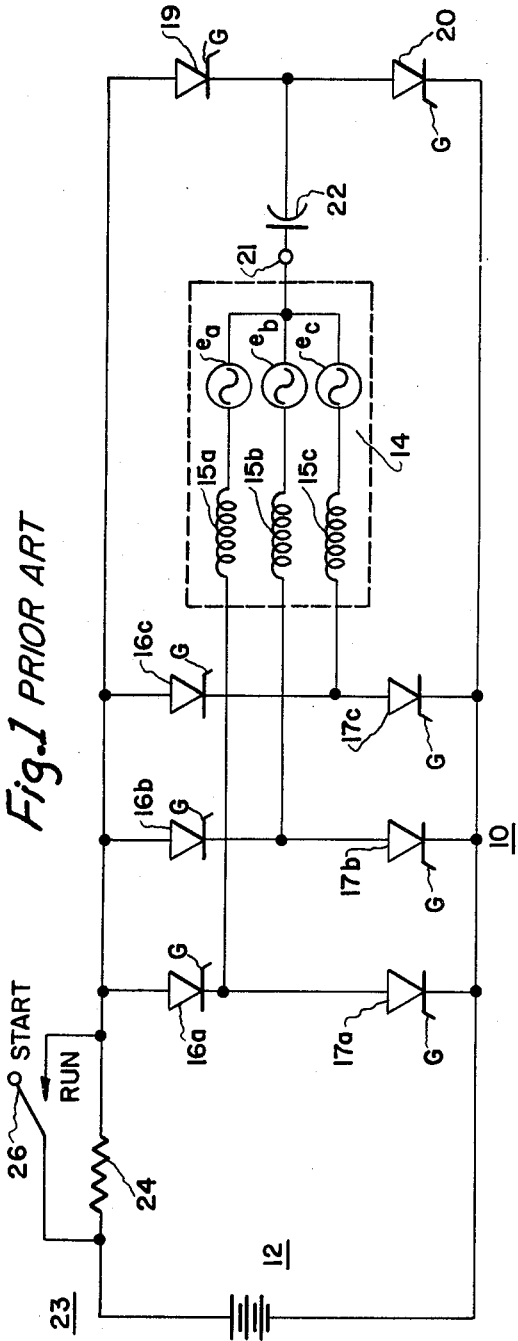
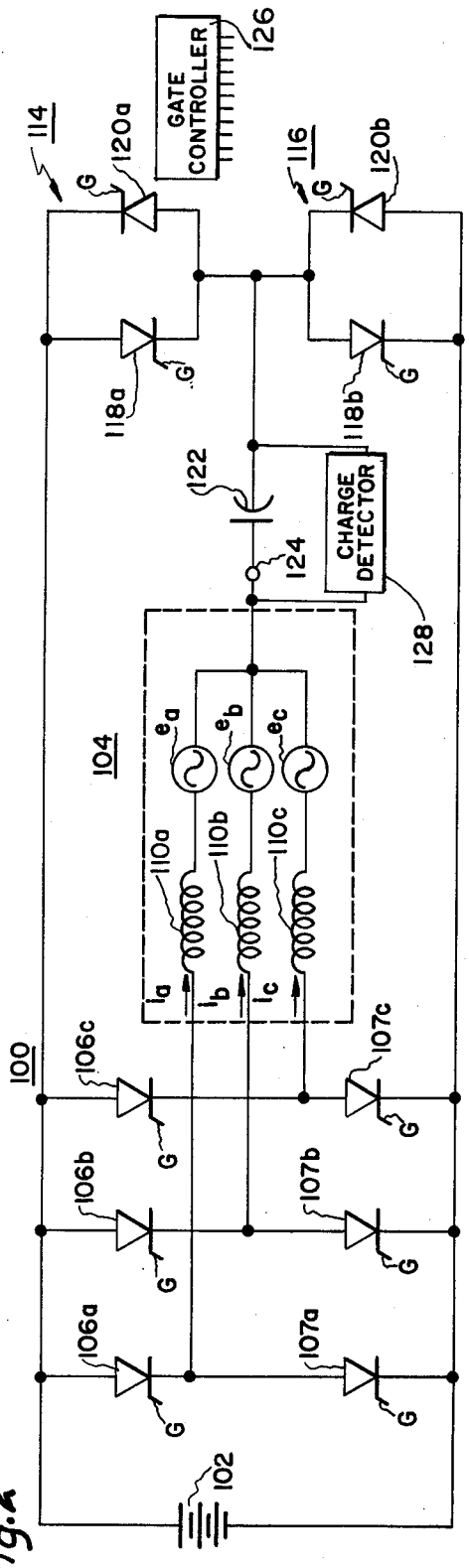

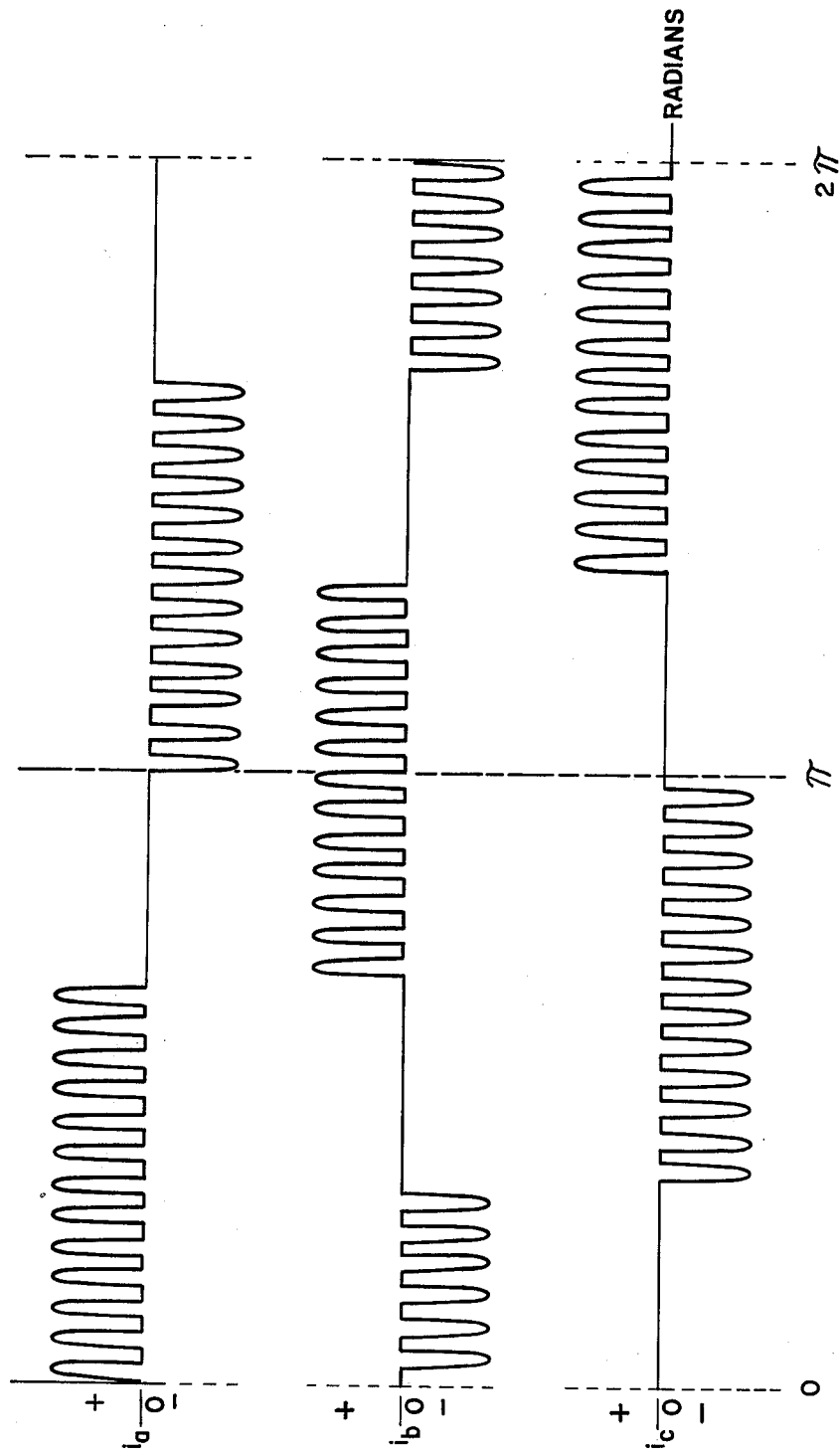

1

FORCED COMMUTATED STARTING CIRCUIT FOR LOAD COMMUTATED INVERTER DRIVE SYSTEM

BACKGROUND OF THE INVENTION

This invention relates to an inverter for exciting a synchronous machine from a source of direct current potential, and more specifically to an inverter capable of providing forced commutation for initial machine excitation.

In many industrial applications where a polyphase synchronous machine is to be employed to provide rotational energy, it is often desirable to excite the machine from a DC source through an inverter. Inverters used in such machine applications are typically comprised of a plurality of pairs of serially-connected controlled unidirectional conductor means, such as thyristors, corresponding in number to the number of machine phases, coupled in parallel across a DC source. Each pair of thyristors is coupled at the pair junction to a corresponding phase of the polyphase machine, respectively. During operation, each of the inverter thyristors is sequentially gated into conductor such that during any one interval, a diagonally opposite pair of thyristors is conductive, thus permitting current conduction in a pair of corresponding machine phases for machine excitation. Induced back electromotive force (EMF) of the polyphase machine serves to commutate, that is to say extinguish current conduction through, each thyristor as a function of machine load variation. By appropriate feedback means, the inverter thyristor gating frequency can be adjusted as a function of load variation to allow adjustment of the frequency of the alternating voltage exciting the machine to achieve machine-inverter synchronization.

To allow load commutation to occur, it is necessary to initially accelerate the synchronous machine to a speed at which load commutation can be achieved. This is usually accomplished by providing additional circuitry to force inverter commutation for an initial time interval.

In the past, inverter circuits of the type described above often included a pair of auxiliary controlled unidirectional conduction means, such as thyristors, serially coupled across the DC source and connected at their pair junction through a commutating capacitor to the machine neutral terminal for causing forced commutation. During intervals of forced commutation, each of the auxiliary thyristors together with predetermined main thyristors were appropriately sequentially gated into conduction to conduct current through a pair of corresponding machine phases, thus providing alternating current sequentially through pairs of machine phases for machine start-up. To reduce current surge caused by the simultaneous conduction of one of the auxiliary thyristors and a diagonally opposite pair of main thyristors, a resistor was used to limit inverter link current drawn from the DC source.

The major disadvantage of such previous circuits is that inverter current is limited by a resistor during forced commutation intervals, thus dissipating energy in the resistor. In addition, limiting the inverter current in the manner of prior art forced commutating circuits requires the value of the commutating capacitor to be relatively large in order to store sufficient charge to commutate each of the inverter thyristors at predetermined intervals.

The present invention concerns an inverter circuit for providing forced commutation which is not subject to the disadvantages of the prior art circuits as enumerated above.

SUMMARY OF THE INVENTION

Briefly, in accordance with the preferred embodiment of the invention, an improved inverter for suitably exciting a star-connected polyphase machine from a source of DC by providing forced commutation thereof to achieve initial machine excitation comprises a plurality of pairs of serially-connected controlled unidirectional conduction means, corresponding in number to the number of machine phases, connected across the source of DC potential in a parallel network. Each pair is adapted for coupling at the junction therebetween to a corresponding machine phase terminal for controlling current in response to control signals impressed on each of the controlled conduction means.

A pair of serially-connected first and second controlled bidirectional conduction means, each controlling current therethrough in response to an external gate signal impressed thereupon, is connected across the DC source. Capacitor means couple the junction of the first and second controlled bidirectional conduction means to a neutral terminal of a synchronous machine and serve to store commutation energy therein. During intervals of forced commutation, each of the controlled unidirectional conduction means and the bidirectional controlled conduction means are sequentially rendered conductive such that only one unidirectional and one bidirectional conduction means will be conductive, thus eliminating current surge and the need to limit inverter link current by a resistor.

It is an object of the invention to provide a forced commutation starting circuit for a load commutated inverter drive system utilizing a relatively small number of forced commutation components.

It is a further object of the invention to provide a forced commutated starting circuit for a load commutated inverter drive system which allows for substantially non-dissipative forced commutation.

It is a further object of the present invention to provide a forced commutated starting circuit which is operative from a direct current voltage source.

BRIEF DESCRIPTION OF THE DRAWINGS

The features of the invention believed to be novel are set forth with particularity in the appended claims. The invention, itself, however, both as to organization and method of operation, together with further objects and advantages thereof, may best be understood by reference to the following description taken in conjunction with the accompanying drawings in which:

FIG. 1 is a schematic diagram of an inverter circuit according to the prior art for providing forced commutation of a three phase synchronous machine;

FIG. 2 is a schematic diagram of the inverter circuit according to the present invention, for providing forced commutation of a three phase synchronous machine; and FIG. 3 is a graphic representation of the respective machine phase currents with respect to time during forced commutation of the synchronous machine by the inverter circuit of FIG. 2.

DETAILED DESCRIPTION OF THE PREFERRED EMBODIMENT

In FIG. 1, there is shown an inverter 10 according to the prior art coupled to a DC source 12 for suitably exciting a polyphase synchronous machine 14, with each of machine phases 15a, 15b and 15c, respectively, represented by a phase inductance serially coupled to a corresponding one of voltage sources $e_a$, $e_b$ and $e_c$, representing the reflected EMF in phases 15a, 15b and 15c, respectively. Inverter 10 typically includes a plurality of pairs of serially-connected controlled unidirectional conduction means such as main thyristors 16a and 17a, 16b and 17b and 16c and 17c, each thyristor conducting current in response to an external gate signal impressed at gate electrode G thereon, the pairs of thyristors being connected in parallel across DC source 12.

Each pair of thyristors corresponds to a respective phase of polyphase synchronous machine 14. Thus, as is shown in FIG. 1 for a three phase machine 14, the respective junction of each pair of thyristors 16a and 17a, 16b and 17b and 16c and 17c is coupled to the corresponding phase 15a, 15b and 15c, respectively, of machine 14 for controlling current conduction therethrough in response to an appropriate gate signal impressed at the corresponding gate electrode G of the appropriate one of thyristors 16a, 17a, 16b, 17b, 16c and 17c.

A pair of serially-connected controlled unidirectional conduction means such as auxiliary thyristors 19 and 20, each conducting current in response to a gate signal impressed at gate electrode G thereof, is coupled across DC source 12 and is coupled at the junction between thyristors 19 and 20 to the neutral terminal 21 of machine 14 by commutating capacitor 22. As will be described more fully below, thyristors 19 and 20 together with thyristors 16a, 17a, 16b, 17b, 16c and 17c provide forced commutation for initially exciting machine 14.

Current limiter 23, comprised of resistor 24 shunted by switch 26, limits inverter link current drawn by inverter 10, thus limiting machine phase current to prevent current surge during forced commutation intervals, by attenuating inverter link current through resistance 24 when switch 26 is open. During other than initial forced commutation time intervals, switch 26 is placed in the "run" position, effectively short-circuiting resistance 24 and allowing full inverter current to be drawn from DC source 12.

To commence forced commutation of inverter 10 for machine start-up, switch 26 is placed in the start position, thus limiting inverter link current drawn from DC source 12. Capacitor 22 is initially charged at a potential with polarity such that the plate connected to terminal 21 is positive with respect to the other plate. A gate control signal from a source (not shown) is first applied to the gate electrode G of thyristors 16a and 17c simultaneously causing the thyristors to conduct current in machine phases 15a and 15c in a first direction. Auxiliary thyristor 19 is gated thereafter, effectively connecting capacitor 22 in parallel with the thyristor 16a. The stored charge in capacitor 22 reverse-biases thyristor 16a extinguishing current conduction therethrough. With thyristor 17c still conductive, current is now conducted through thyristor 19 and machine phase 15c, reversing the polarity of the potential across capacitor 22.

Thyristor 16b is next gated into conduction, causing machine phase 15b to conduct inverter load current. With thyristor 16b conductive, the stored charge of capacitor 22 then serves to reverse-bias, and hence commutate, thyristor 19. At this time, current is present in machine phases 15b and 15c.

During the next inverter mode, auxiliary thyristor 20 is gated into conduction, effectively connecting capacitor 22 across thyristor 17c. The stored charge on capacitor 22 serves to reverse-bias, and hence commutate, thyristor 17c. With thyristor 16b still conductive, current through machine phase 15b is diverted through thyristor 20, causing the polarity of potential across capacitor 22 to once again reverse. Thyristor 17a is next gated into conduction, causing stored capacitor charge to reverse-bias thyristor 20 and extinguish current conduction therethrough.

The next inverter mode begins with thyristor 19 again being gated into conduction, causing stored capacitor charge to reverse bias and thus commutate thyristor 16b. Thyristor 17a remains conductive, causing inverter load current conduction through thyristor 19 and machine phase 15a. With thyristor 19 conductive, the polarity of potential across capacitor 22 once again reverses, causing the right hand plate to appear more positive with respect to the left hand plate. Thyristor 16c is next gated into conduction, causing thyristor 19 to be commutated. Current conduction now occurs through the loop of thyristor 16c, machine phase 15c, machine phase 15a and thyristor 17a.

To commence the next inverter mode, thyristor 20 is once again gated into conduction, causing stored capacitor charge to reverse bias thyristor 17a, extinguishing current therethrough. With thyristor 17a commutated, and thyristor 16c still conductive, current is conducted through machine phase 15c and through thyristor 20, thereby reversing the polarity of potential across capacitor 22. Thyristor 17b is next rendered conductive, which, in turn, causes thyristor 20 to be commutated. As a result, current is conductive through machine phases 15c and 15b.

The final inverter mode begins with thyristor 19 again being gated into conduction to commutate then-conductive thyristor 16c. Current is diverted through thyristor 19 and continues through machine phase 15b as thyristor 17b still remains conductive. Again, capacitor potential reverses polarity. Thyristor 16a is next gated into conduction, causing capacitor charge to commutate then-conductive thyristor 19. With thyristors 16a and 17b conductive current is conducted through machine phases 15a and 15b.

The commutation sequence of inverter modes, as described above, starts again after thyristor 20 is rendered conductive to commutate previously-conductive thyristor 17b. Thyristor 16a remains conductive, causing current to be conducted through the serial combination of machine phase 15a, commutating capacitor 22 and thyristor 20, thus reversing the polarity of capacitor potential.

To repeat the inverter mode sequence, thyristor 17c is gated into conduction, causing capacitor charge to commutate thyristor 20. With thyristor 20 commutated, current conduction in a first direction through machine phases 15a and 15c, respectively, is resumed. The above-described sequence of steps is repeated continuously until a critical machine speed is achieved. At this speed, load commutation may be commenced by continuing sequential conduction of each of thyristors 16a–16c and 17a–17c, in the manner described previously, after each thyristor is sequentially commutated by back EMF of motor 14. During forced commutation intervals, power is continually dissipated by current conduction through resistor 24.

In FIG. 2, there is shown an inverter circuit 100, according to the teachings of the present invention, connected to a DC source 102 for suitably exciting a star-connected polyphase synchronous machine 104. As with the prior art inverter 10 shown in FIG. 1, inverter 100 includes a plurality of pairs of serially-connected, controlled unidirectional conduction means, such as thyristors, each pair coupled across DC source 102 in series-aiding fashion. The specific number of thyristor pairs corresponds to the number of phases of polyphase machine 104. Thus, for a three phase star-connected synchronous machine as shown in FIG. 2, three pairs of serially connected main thyristors 106a and 107a, 106b and 107b, and 106c and 107c are coupled in parallel across DC source 102 and are connected at their respective pair junctions to the corresponding phases 110a, 110b and 110c, respectively, of machine 104.

Each of thyristors 106a, 106b, 106c 107a and 107b and 107c conducts current in response to a gate signal impressed at the respective gate electrode G thereof, thus controlling current in machine phases 110a–110c of machine 104. Thyristors 106a through 106c and 107a–107c typically are high current thyristors.

To provide forced commutation for machine 104, inverter 100 includes a pair of controlled bidirectional conduction means 114 and 116, connected in series across the source of DC potential 102. Controlled bidirectional conduction means 114 and 116 are each typically comprised of a pair of controlled unidirectional conduction means connected in parallel opposition, such as auxiliary thyristors 118a and 120 and 118b and 120b, respectively. Alternatively, a controlled bidirectional conduction device such as a triac, could be employed in place of each pair of parallel connected thyristors. Unlike the pair of auxiliary thyristors 19 and 20 in inverter 10 of FIG. 1 for providing forced commutation therefor, each of controlled bidirectional conduction means 114 and 116 can conduct current in either direction therethrough. The significance of bidirectional current conduction will be more fully explained below by reference to the operation of inverter 100 during forced commutation time intervals.

A commutating capacitor 122, of lower capacitor than the commutating capacitor 21 of the prior art inverter of FIG. 1, is connected between the neutral terminal 124 of machine 104 and the junction of controlled bidirectional conduction means 114 and 116.

Operation of inverter 100 during forced commutation time intervals will now be described with reference to FIGS. 2 and 3. It is assumed that machine 104 is starting from rest and that each of voltages $e_a$, $e_b$ and $e_c$, respectively, representing back EMF in each phase of machine 104, is zero. Also, component resistances will be neglected. It is also assumed that each of line currents $i_a$, $i_b$ and $i_c$ in machine 104 is positive when in the direction indicated by the arrow, respectively.

To initially provide line currents $i_a$, $i_b$ and $i_c$ in the corresponding phases 110a, 110b and 110c, respectively, of machine 104 such that a proper three phase current relationship may be derived for initial machine excitation, thyristors 106a, 106b and 106c and 107a, 107b, and 107c together with controlled bidirectional conduction means 114 and 116 are gated in the following sequence. A gate control signal from gate controller 126 is applied to the gate electrode G of the thyristor 106a and thyristor 118b, producing a positive pulse $i_a$ through phase 110a which charges capacitor 122. A potential thus develops across capacitor 122, causing the lefthand plate of capacitor 122 to become more positive with respect to the right hand plate. Thyristor 106a and 118b each self extinguish when the voltage across capacitor 122 reaches a predetermined level.

Thyristors 107b and 120b are thereafter gated into conduction by appropriate gate control signals. This results in capacitor 122 being discharged through second phase 110b of machine 104, producing a negative current pulse $i_b$. Thyristors 107b and 120b also self extinguish when the voltage across capacitor 122 reaches a predetermined level.

Thyristors 106a and 120a are next gated into conduction by an appropriate gate control signal impressed at the gate terminal G thereof to produce a positive current pulse $i_a$ again through first machine phase 110a. This current pulse results from energy, previously stored in the LC circuit comprised of the inductance of machine phase 110a and capacitor 122, transferring between the inductive machine phase 110a and capacitor 122. Each of thyristors 106a and 120a self extinguish when the voltage across capacitor 122 reaches a predetermined level.

Thyristor 107b is next gated again together with thyristor 120b of controlled bidirectional conduction means 116 so as to permit electrical energy stored on capacitor 122 to produce another negative current pulse $i_b$ in machine phase 110b. Thyristors 107b and 120b similarly self extinguish when the voltage across capacitor 122 reaches a predetermined level.

To next achieve a negative current pulse $i_c$ through third machine phase 110c, thyristors 107c and 120b are appropriately gated so as to permit current conduction therethrough.

To achieve machine phase current conduction in an opposite direction to the sequence described above, thyristors 107a, 106b and 106c are gated instead of thyristors 106a, 107b and 107c, respectively, and thyristors 118a and 120b are gated instead of thyristors 118b and 120a, respectively.

Gating each of thyristors 106a–106c and 107a–107c together with one of thyristors 118a and 120a and 118b and 120b, respectively, in the sequence described above to produce current pulses $i_a$, $i_b$ and $i_c$, eliminates current surge caused in prior art inverter 10 by the simultaneous conduction of two main and one auxiliary thyristor during the interval prior to commutation of a corresponding main inverter thyristor. Thus, the need for a current limiting resistor is eliminated, resulting in a high-efficiency inverter. As is evident by inspection of FIG. 3, the current pulses $i_a$, $i_b$ and $i_c$ are in proper three-phase relationship with one another.

As noted above, the operation of inverter 100 has been described assuming that component resistances are negligible. In practice, however, even though component resistances are small, the amplitude of current pulses $i_a$, $i_b$ and $i_c$ will gradually diminish and decay to zero unless capacitor charge is refreshed. Capacitor charge can be refreshed in the following manner: If, after an interval of a positive current pulse $i_a$ through machine phase 110a of machine 104, (resulting from thyristors 106a and 120a having been gated) followed by an interval of a negative machine current pulse $i_c$ through machine phase 110c, the charge measured on capacitor 122, as measured by charge detector 128, has decayed below a predetermined value, then capacitor charge may be refreshed during the next interval of a corresponding positive current phase $i_a$ through machine phase 110a by gating thyristors 106a and 118b as opposed to gating thyristors 106a and 120a. By gating thyristors 106a and 118b, capacitor 122 is effectively coupled across DC source 102 in series with machine phase 110a and thus will charge to a value corresponding to approximately twice the magnitude of the DC source voltage because of stored energy in machine phase 110a adding to the potential across DC source 102.

The charge on capacitor 122 may also be refreshed during an interval of a negative current pulse $i_c$ through machine phase 110c by gating thyristors 107c and 118a rather than thyristors 107c and 120b. This causes capacitor 122 to be coupled across the source of DC potential 102 in series with machine phase 110c so as to charge to a value corresponding to approximately twice the magnitude of DC source voltage because of stored energy in machine phase 110c adding to the potential across source 102. Although recharging of capacitor 122 has been described only with respect to current conduction through the first and third machine phases 110a and 110c, respectively, recharging can be accomplished, according to the principal described above, during any point of the fundamental gating sequence cycle. As machine 104 continues to increase in speed of rotation from rest, increasing energy is drawn from source 102, thus requiring increased capacitor recharging energy. Eventually as rotational speed increases, together with a corresponding increase in internal EMF in each machine phase, the recharging requirement of capacitor 122 increases to the level such that the respective pair of thyristors which are gated so as to permit a positive charge to be stored on the capacitor, are conducting continually. When, however, the motor rotation reaches a speed such that internal back EMF exceeds the DC supply voltage, natural load commutation is allowed to occur.

The foregoing describes an inverter circuit for a load commutated inverter drive system which provides substantially non-dissipative forced commutation. The circuit utilizes a small number of forced commutation components and is capable of operation from a direct current voltage source.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What is claimed is:

1. In an inverter polyphase synchronous machine drive system including a polyphase synchronous machine excited from a source of direct current potential by an inverter, said inverter providing forced machine commutation for initial excitement thereof, said inverter comprising:
    a plurality of pairs of serially-connected unidirectional conduction means corresponding in number to the number of machine phases, each pair of said conduction means connected across said source of direct current potential and coupled at the pair junction to a corresponding machine phase, respectively, each said conduction means controlling current therein in response to a gate control signal impressed thereon;
    first and second controlled bidirectional conduction means serially connected across said source of direct current potential, each said controlled bidirectional conduction means conducting current in a direction determined by an external gate signal impressed thereon;
    capacitor means connected between the junction of said first and second controlled bidirectional conduction means and the neutral terminal of said polyphase machine;
    means for determining the charge of said capacitor; and
    means for providing gate control signals to each of said unidirectional conduction means and each of said bidirectional current means to cause current to flow in a predetermined sequence through said machine phases with energy supplied by said capacitor, when said capacitor charge is above a predetermined value and for providing gate control signals to each of said unidirectional conduction means and each of said bidirectional current means to cause current to flow in said predetermined sequence through said machine phases and to charge said capacitor, with energy supplied by said source of DC potential when said capacitor charge is below a predetermined value.

2. The invention according to claim 1 wherein each of said controlled unidirectional conduction means comprises a thyristor having a gate terminal adapted for receiving an external gate control signal.

3. The invention according to claim 1 wherein each of said first and second controlled bidirectional conduction means comprises:
    a pair of controlled unidirectional conduction means connected in parallel-opposition, each controlled conduction means respectively conducting current in response to a gating signal impressed thereupon.

4. The invention according to claim 3 wherein each of said controlled unidirectional conduction means comprises a thyristor having a gate electrode adapted to receive a gating signal.

5. A method of sequencing three main pairs of unidirectional switch means during forced commutation of a 3 phase bridge inverter supplying 3 phase power to a star connected load, said inverter having auxiliary switch means appropriately conducting during each of the following steps to provide a complete current path through a phase of said load, the method comprising the consecutive steps of:
    (a) Switching the upper switch means in the first main pair on while switching the lower switch means in the third main pair off;
    (b) Switching the lower switch means in the third main pair on while switching the upper switch means in the first main pair off;
    (c) Repeating step a followed by step b a plurality of times, the number of repetitions being dependent upon the desired period of the current supplied to said load;
    (d) Switching the lower switch means in the third main pair on while switching the upper switch means in the second main pair off;
    (e) Switching the upper switch means in the second main pair on while switching the lower switch means in the third main pair off;
    (f) Repeating step d followed by step e a plurality of times, the number of repetitions being dependent upon the desired period of the current supplied to said load;
(g) Switching the upper switch means in the second main pair on while switching the lower switch means in the first main pair off;
(h) Switching the lower switch means in the first main pair on while switching the upper switch means in the second main pair off;
(i) Repeating step g followed by step h a plurality of times, the number of repetitions being dependent upon the desired period of the current supplied to said load;
(j) Switching the lower switch means in the first main pair on while switching the upper switch means in the third main pair off;
(k) Switching the upper switch means in the third main pair on while switching the lower switch means in the first main pair off;
(l) Repeating step j followed by step k a plurality of times, the number of repetitions being dependent upon the desired period of the current supplied to said load;
(m) Switching the upper switch means in the third main pair on while switching the lower switch means in the second main pair off;
(n) Switching the lower switch means in the second main pair on while switching the upper switch means in the third main pair off;
(o) Repeating step m followed by step n a plurality of times, the number of repetitions being dependent upon the desired period of current supplied to said load;
(p) Switching the lower switch means in the second main pair on while switching the lower switch means in the second main pair off;
(q) Switching the upper switch means in the first main pair on while switching the lower switch means in the second main pair off;
(r) Repeating steps a–r.

* * * * *